(12) United States Patent
Heren

(10) Patent No.: US 7,836,993 B2
(45) Date of Patent: Nov. 23, 2010

(54) DEVICE FOR SELECTING A HYDRAULIC CIRCUIT OVERALL CAPACITY

(75) Inventor: Jean Heren, Margny les Compiegne (FR)

(73) Assignee: Poclain Hydraulics Industrie, Verberie (FR)

(*) Notice: Subject to any disclaimer, the term of this patent is extended or adjusted under 35 U.S.C. 154(b) by 358 days.

(21) Appl. No.: 11/914,464

(22) PCT Filed: May 17, 2006

(86) PCT No.: PCT/FR2006/050451
§ 371 (c)(1),
(2), (4) Date: Feb. 25, 2008

(87) PCT Pub. No.: WO2007/000534
PCT Pub. Date: Jan. 4, 2007

(65) Prior Publication Data
US 2008/0196961 A1    Aug. 21, 2008

(30) Foreign Application Priority Data
May 18, 2005   (FR) ................................ 05 04969

(51) Int. Cl.
*B60K 17/354* (2006.01)
(52) U.S. Cl. .......................... 180/247; 60/427
(58) Field of Classification Search .......... 180/242, 180/245, 247, 306, 308; 60/420, 425, 427, 60/421
See application file for complete search history.

(56) References Cited

U.S. PATENT DOCUMENTS

| 3,656,570 | A | * | 4/1972 | Gortnar et al. ............. 180/6.48 |
| 3,900,075 | A |   | 8/1975 | Chichester et al. |
| 3,916,625 | A | * | 11/1975 | Holtkamp .................... 60/421 |
| 3,978,937 | A | * | 9/1976 | Chichester et al. .......... 180/242 |
| 5,199,525 | A |   | 4/1993 | Schueler |

FOREIGN PATENT DOCUMENTS

| EP | 0 294 662 | 12/1988 |
| EP | 0547947 | 6/1993 |
| EP | 0 916 542 | 5/1999 |

OTHER PUBLICATIONS

International Search Report-PCT/FR2006/050451.
* cited by examiner

*Primary Examiner*—Tony H. Winner
(74) *Attorney, Agent, or Firm*—Ladas & Parry LLP

(57) ABSTRACT

A hydraulic circuit including a first motor set, and a second motor set for driving vehicle-moving means situated one behind the other. The circuit has first, second, third, and fourth main ducts for feeding the motor sets in parallel. The device includes a selector suitable for taking up a first stable position making the feeding in parallel possible by interconnecting in pairs the feed and discharge main ducts, and for taking up a second stable position in which one of the motor sets is inactive because one of the main ducts is connected to one of main ducts of the other set. Between the stable positions, the selector can take up a temporary position, in which all four main ducts are interconnected. At least while the selector is moving in one direction between its two stable positions, the temporary position is sustained in an intermediate stage during which at least one of the interconnections between the main ducts of the first and second motor sets is constricted.

19 Claims, 4 Drawing Sheets

DEVICE FOR SELECTING A HYDRAULIC CIRCUIT OVERALL CAPACITY

BACKGROUND OF THE INVENTION

The present invention relates to a device for selecting the overall cubic capacity of a hydraulic circuit comprising a first motor set comprising at least one first hydraulic motor for driving first vehicle-moving means for moving a vehicle, and a second motor set comprising at least one second hydraulic motor for driving second vehicle-moving means for moving the vehicle, said first and second vehicle-moving means being situated one behind the other in a direction in which the vehicle moves, the circuit further comprising first and second main ducts for the first motor set, and third and fourth main ducts for the second motor set, the first and third main ducts and the second and fourth main ducts being suitable for being connected in respective pairs to respective ones of two orifices of a pump for feeding and discharging the motor sets in parallel, the device comprising a selector suitable for taking up a first stable position corresponding to a first configuration of the selector device, in which configuration the third and fourth main ducts are connected to respective ones of the orifices of the pump, and said third and fourth ducts are isolated from each other so that the second motor set is active, and for taking up a second stable position corresponding to a second configuration of the selector device, in which configuration one of the first and second main ducts is connected to the third and fourth main ducts, so that the second motor set is inactive, the selector being such that, while the selector is moving between said stable positions, a temporary situation exists in which the first, second, third, and fourth ducts are interconnected.

A device of this type is known from Document U.S. Pat. No. 5,199,525.

The circuit to which the invention applies is, in particular the drive circuit of a vehicle having two driven axles to which the first and second motor sets are respectively coupled.

Each of the motor sets can have a single cubic capacity. In which case, when both motor sets are fed in parallel, the maximum overall cubic capacity of the hydraulic circuit is the sum of the cubic capacities of each of the two motor sets. When, with the selector device being in its second configuration, the second motor set is inactive, the overall cubic capacity of the circuit corresponds to the cubic capacity of the first motor set which remains active.

Naturally, the invention also applies to a configuration in which at least one of the motor sets has variable cubic capacity. In particular, the first motor set can have two distinct operating cubic capacities, while the second moor set has a single cubic capacity. The circuit can then have three distinct overall cubic capacities:

- a maximum overall cubic capacity when the first motor set is in large cubic capacity mode and when the selector device for selecting the overall cubic capacity is in its first configuration so that both motor sets are active;
- an intermediate overall cubic capacity when the first motor set is in large cubic capacity mode and when the device is in its second configuration, so the second motor set is inactive; and
- a minimum overall cubic capacity when the first motor set is in small cubic capacity mode and the second motor set is still inactive.

Naturally, different combinations can be imagined, e.g. another, intermediate cubic capacity in which the first and second motor sets are active, but in which the first motor set is in small cubic capacity mode.

The vehicle-moving means can be of any known types, such as wheels, tracks, a ball, etc.

The term "motor set" is used to mean a set of at least one motor coupled to vehicle-moving means. For example, if the vehicle-moving means are wheels, and if each axle has two wheels, each motor set can either comprise a single motor driving both of the wheels on the same axle, or else each set can comprise two motors coupled to respective ones of the two wheels and fed in parallel. Each motor can be of any type known per se, e.g. it can be constituted by a motor having a single cubic capacity and having two orifices serving respectively as a feed orifice and as a discharge orifice, or else by a motor having two distinct cubic capacities and made up of two sub-motors, each of which has a feed orifice and a discharge orifice, or indeed by a motor having two distinct cubic capacities and made up of two sub-motors having a common first orifice for feed or for discharge, and each having a distinct second orifice for feed or for discharge, the distinct orifices being suitable for being connected respectively to an orifice of the pump and to an orifice of a receiver connected to the same circuit. Such motors can be said to be "three-orifice motors", and they are described in EP 0 547 947.

The invention applies to drive circuits for driving vehicles either having a preferred direction or not having a preferred direction. For a vehicle having a preferred direction (forwards), provision is made for that one of the first and second main ducts with which the third and fourth main ducts are put into communication in order to make the second motor set inactive to be the main duct that serves as the discharge duct for the first motor set in said preferred operating direction of the vehicle.

For such a vehicle, the non-preferred direction, i.e. reverse, corresponds to movement at low speed, during which movement the selector device for selecting the overall cubic capacity of the circuit is not normally used.

For driving a vehicle with no preferred operating direction, the circuit can be equipped with a valve making it possible, for deactivating the second motor set, to select that one of the first and second main ducts that is at the lower pressure, and to connect it to the third and fourth main ducts.

The temporary situation in which the first, second, third, and fourth main ducts are interconnected while the selector is going between said two stable positions serves to prevent the selector from being blocked and to prevent the feed to the second motor set from being blocked. In this provisional situation, all of the main ducts communicate with one another, and the vehicle freewheels.

Since both motor sets are fed by the same pump, going from one overall cubic capacity to the other causes a jolt in the drive of the vehicle. For any given flow-rate of the pump, the total torque delivered by the motor sets is higher but their speed is lower in the large overall cubic capacity situation than in the small overall cubic capacity situation. Therefore, when the selector device goes from its first configuration to its second configuration, the circuit goes into small overall cubic capacity mode, and an acceleration jolt is generated. Conversely, when the selector device goes from its second configuration to its first configuration, a braking jolt is generated. The braking jolt can be avoided or attenuated by the operator if, at the same time as the operator causes the device to go from its second configuration to its first configuration, said operator rapidly increases the flow rate of fluid delivered by the pump. Causing such an increase to take place is difficult and can be automated only by using a relatively costly device.

While the selector device for selecting the overall cubic capacity is going into its second configuration, the second motor set is deactivated, so that the drive means coupled to said second set naturally cease to be driving. Thus, the vehicle is then driven only by the drive means coupled to the first motor set which is active, but whose speed increases suddenly. On certain types of ground, such a sudden increase in speed can give rise to loss of grip, which is detrimental to the handling of the vehicle. Similarly, while going from the second configuration to the first configuration, the vehicle-moving means are suddenly driven at low speed. This jolt can also give rise to loss of grip and, since the drive means of the two axles are synchronized only via the ground, such loss of grip can give rise to loss of synchronization, which is also detrimental to the handling of the vehicle and to controlling its path.

As indicated above, the temporary situation in which the first, second, third, and fourth main ducts are interconnected, serves to prevent the device from being blocked. Up until now, for circuits in which the two motor sets drive distinct axles, ways have always been sought of making this provisional situation as short as possible.

EP 0 294 662 proposes to deactivate one of the motor sets of a circuit by connecting its main ducts to the reservoir, thereby making it possible to cause that motor set to freewheel by retracting the pistons into the cylinders. A temporary situation, in which the various main ducts communicate with one another, is generated by means of a selector whose movement is controlled.

The invention concerns a different context, in which the deactivated motor set is put into freewheel mode not by retracting the pistons into the cylinders by rather by being bypassed, its main ducts being connected together and to one of the main ducts of the other motor set. In addition, EP 0 294 662 does not make it possible to avoid jolts at the end of the movement of the slide because, in the intermediate situation, the motor set that was deactivated or that is to be deactivated does not deliver any torque.

An object of the invention is to remedy the phenomenon of jolting that is observed when changing the overall cubic capacity of a circuit of the type indicated in the introduction, or at least to attenuate that phenomenon.

This object is achieved by the fact that the selector device of the invention further comprises means serving, at least while the selector is moving in a first direction between its first and second stable positions, to sustain said temporary situation for a period of time in an intermediate stage during which an interconnection between the third and fourth main ducts and an interconnection between at least one of the first and second main ducts and at least one of the third and fourth main ducts are constricted.

Thus, with the invention, the temporary situation is maintained so as to enable fluid flow rate exchange to take place between the main ducts and thus, so as to avoid a sudden variation in said flow rate. The motors are not totally deactivated in this temporary situation because the above-mentioned interconnections are constricted in this situation, so that the main ducts do not communicate freely with one another.

By means of the constriction in the interconnection between the third and fourth main ducts in the intermediate stage, the second motor set then delivers limited torque that depends on the head loss due to said constriction. As a result, while the selector is finishing its movement, the increase or the decrease in the total torque delivered by the motor sets is much smaller than in the above-mentioned prior art, and is thus not sudden, thereby making it possible to avoid jolting.

In particular, the temporary situation is maintained while the selector is moving from its second position to its first position, i.e. during a movement of the selector that leads to an increase in the overall cubic capacity of the circuit. For example, if the first and second motor sets are serving to drive respectively the wheels of the first axle and the wheels of a second axle of a 5 (metric) tonne (T) vehicle moving at a speed of about 10 kilometers per hour (km/h) at the time of the cubic capacity change, and if the torques delivered by the motors respectively in small overall cubic capacity mode and in large overall cubic capacity mode are respectively 1500 newton-meters (N.m) and 3000 N.m, the period of time for which the temporary situation is sustained can be of the order of in the range $3/10^{ths}$ of a second to $5/10^{ths}$ of a second, or even of the order of 1 second. The same applies for two motor sets each driving a respective one of the vehicle-moving member sets of a 24 T vehicle (i.e. 12 T per motor set) at a speed of the order of 3 km/h at the time of the cubic capacity change, the torques delivered by the motor sets respectively in small cubic capacity mode and in large cubic capacity mode being respectively 2000 N.m and 4000 N.m. For sustaining the temporary situation, the movement of the selector can be slowed down or braked, or even substantially stopped for the necessary period of time.

It is possible to choose to implement the invention in such a manner as to limit the jolting in only one change direction in which the valve goes from one position to the other, e.g. on going from the small cubic capacity to the large cubic capacity.

It is also possible to choose to limit the jolting in both change directions, by making provision for an intermediate stage as indicated above to exist in both directions. As explained below, it is possible to choose to make provision so that, in the intermediate stage, the cross-section of at least one of the passages between the first and third ports and between the second and third ports is reduced, while the cross-section of the other passage makes it possible for fluid to flow substantially freely. It is also possible to choose to make provision for the cross-sections of the two passages to be constricted or calibrated while being different from each other.

Advantageously, during the intermediate stage, the interconnection between the third and fourth main ducts and the interconnection between at least one of the first and second main ducts and at least one of the third and fourth main ducts have constricted cross-sections that are different.

For example, the interconnection between the third and fourth main ducts is less constricted than the interconnection between at least one of the first and second main ducts and at least one of the third and fourth main ducts.

Advantageously, the selector is a valve having at least three ports, comprising first, second, and third ports connected respectively to the first, to the second, and to the third main ducts, and the device further comprises means for interconnecting the second and the fourth main duct, the first and second main ducts being respectively connected to the first and to the second orifices of the pump.

In which case, it is possible to choose to sustain the intermediate stage while going from the second position to the first position, i.e. on going from the small overall cubic capacity to the large overall cubic capacity of the circuit, while making provision so that, in the intermediate stage, the passage between the third port and the second port forms a constriction while the passage between the first port and the third port is substantially non-constricted or, at least, is less constricted than the passage between the third port and the second port.

In which case, if it is considered that the vehicle is traveling forwards, and that the main duct is connected to the fluid feed, the first and third ports being put into communication with each other causes the cubic capacity that is to be fed to be increased, so that the pressure tends to decrease in the feed first main duct, with this decrease being compensated by boosting. At the same time, since the second and the third ports are put partially into communication with each other, via the above-mentioned constriction, the increase in the pressure in the second main duct that serves as the discharge duct is limited. The constriction causes head loss. This makes it possible to manage the appearance of backpressure in said duct and therefore to control the braking of the vehicle.

Since the movement of the vehicle is slowed down in the intermediate stage, the second port and the third port continue to be put into constricted communication with each other for the time necessary for the kinetic energy of the vehicle to be consumed by the braking effect of the motors.

Advantageously, the valve has a fourth port connected to the fourth main duct and, when the selector is in the first stable position, the first and second ports and the second and fourth ports are interconnected in respective pairs, and, when the selector is in the second stable position, the third and fourth ports are interconnected and are connected to one of the first and second ports while being isolated from the other of the first and second ports, whereas, in the temporary situation, the first and second ports are connected via a first passage having a first constriction, the second and fourth ports are interconnected via a second passage having a second constriction, and an additional passage having an additional constriction exits between the first and second ports or between the third and fourth ports.

When the selector is a valve of this type, it has analogous connections to the first and second main ducts and to the second and fourth main ducts.

Advantageously, the selector device further comprises means for causing the selector to move between said stable positions, during which movement said temporary situation exists, which control means are suitable for causing a fast movement first step to take place between the initial stable position of the selector and a position corresponding to the beginning of the intermediate stage, and for causing a braked movement step to take place during which the intermediate stage takes place.

Advantageously, the control means are also suitable for causing another fast movement step to take place towards the other stable position, at the end of the intermediate stage.

Thus, the movement of the selector is slowed down during the intermediate stage only, without the other stages in the movement of the selector being slowed down, thereby making it possible to prevent the time taken to go from one position to the other from being too long.

For example, the speed of movement of the selector during the intermediate stage is at the most equal to one third of its speed of movement during the fast movement first step. For example, the slowing down is such that the length of time of the intermediate stage is at least equal to two-thirds of the total time taken by the selector to move between its two end positions.

Preferably, the selector is a valve comprising a slide mounted to move in a bore, the slide being suitable for taking up two opposite positions corresponding to respective ones of the first and second stable positions of the selector, and, while it is moving between these two opposite positions, being suitable for taking up an intermediate position corresponding to said temporary situation.

The control means for causing the selector to move can be hydraulic, electronic, or indeed a combination of hydraulic means and of electronic means. When they are present, the electronic means advantageously comprise a servomechanism. These control means can be of the type described in EP 1 058 002 or WO 01/61186.

Thus, the selector device advantageously further comprises means for causing the selector to move between said stable positions, during which movement said temporary situation exists, which means are suitable for servo-controlling a variable that is representative of operation of the vehicle to a set point by causing the selector to move in controlled manner between said two positions.

The representative variable is preferably determined on the basis of at least one of the parameters constituted by the pressure in at least one of the main ducts, the flow rate in at least one of the main ducts, the output torque of at least one of the motors, the number of revolutions at the outlet of at least one of the motors, the speed of the vehicle, position relative to a target, distance relative to a target, the acceleration or the deceleration of the vehicle, the acceleration or the deceleration of at least one of the motors, an operating parameter of the pump, the power being consumed, an operating parameter of an auxiliary motor driving said pump, and an operating parameter of a tool fed hydraulically from the circuit.

Advantageously, the control means for causing the selector to move further comprise electronic control means, and said device further comprises means for measuring the value of at least one critical parameter, for computing the value of the representative variable, and for causing the selector to move from one to the other of its stable positions as a function of the value of the computed representative variable.

BRIEF DESCRIPTION OF THE DRAWING FIGURES

The invention can be well understood and its advantages appear more clearly on reading the following detailed description of embodiments shown by way of non-limiting example. The description refers to the accompanying drawings, in which.

DETAILED DESCRIPTION OF THE PREFERRED EMBODIMENTS

Figure 1:
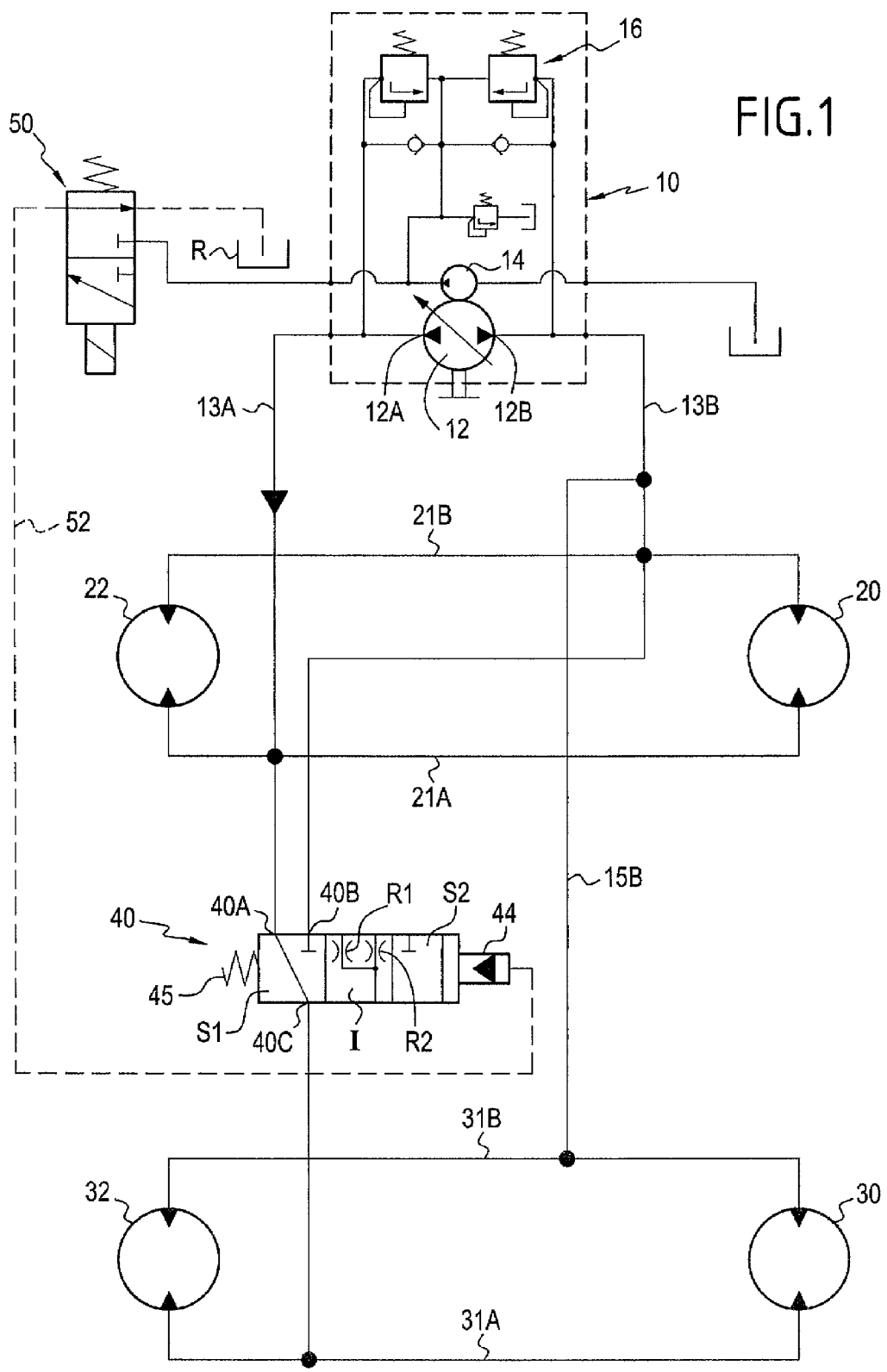
FIG. 1 is a diagram showing a hydraulic circuit including a cubic capacity selector device of the invention, in a first embodiment in which the selector of said device is a three-port valve.

The circuit shown in FIG. 1 serves to drive in translation a vehicle having two axles, each of which has a pair of driven wheels.

This circuit includes a pump unit 10 with a main pump 12, a booster pump 14, and pressure limiter devices 16 that are conventional. Since the circuit is of the closed type, each of the two orifices of the main pump 12 is connected to a duct which, depending on the drive direction of the pump, serves as a feed duct or as a discharge duct.

The first motor set comprises two motors 20 and 22, for driving respective ones of the right and left wheels of the first axle of the vehicle. The second motor set comprises two motors 30 and 32 for driving respective ones of the right and left wheels of the second axle.

The circuit includes first and second main ducts 21A and 21B, to which the motors 20 and 22 of the first set are connected in parallel. Thus, if it is considered that the orifices 12A and 12B of the pump serve respectively as delivery outlet and as suction inlet, so that the ducts 13A and 13B connected to respective ones of these orifices serve respectively as a feed duct and as a discharge duct, the first main duct 21A, which is connected to the duct 13A, serves to feed the motors 20 and 22, while the second main duct 21B, which is connected to the duct 13B, serves as discharge for these motors.

Similarly, the circuit includes a third main duct 31A and a fourth main duct 31B to which the motors 30 and 32 of the second set are connected in parallel. In the first embodiment shown in FIG. 1, the fourth main duct 31B is connected continuously to the second main duct 21B, via an interconnection duct 15B external to the selector 40.

The circuit includes a selector device for selecting its overall cubic capacity, which device, depending on its configuration, can make the motors of the second set active or inactive.

This device comprises a selector 40 which, in the first embodiment shown in FIG. 1 is a three-port valve, having its first port 40A connected to the first main duct 21A, its second port 40B connected to the second main duct 21B, and its third port 40C connected to the third main duct 31A. FIG. 1 shows the valve 40 in its first stable position S1, in which the first and second ports 40A and 40C are interconnected while being isolated from the second port 40B. Insofar as, in addition, the second main duct 21B and the fourth main duct 31B are interconnected, this first position S1 of the valve of the selector 40 makes it possible for the motor sets to be connected in parallel to the orifices of the pump.

The valve 40 is suitable for taking up a second stable position S2 in which its second and its third ports 40B and 40C are interconnected while being isolated from the first port 40A. In which case, the second motor set is bypassed because the third and fourth main ducts 31A and 31B are interconnected. The third main duct 31A is connected to the second main duct 21B via the interconnection between the ports 40B and 40C and, as indicated above, the fourth main duct 31B is also connected to the second main duct 21B.

When the valve 40 is in its first position S1, the second motor set is active since the third main duct 31A is connected to the orifice 12A of the pump due to it being connected to the first main duct, via the interconnection between the ports 40A and 40C of the valve, the fourth main duct 31B being connected continuously to the second orifice 12B of the pump while being isolated from the third main duct because the second port 40B of the valve is isolated from the other two ports.

Between these two stable positions S1 and S2 of the valve, which positions are end positions, lies an intermediate position I which corresponds to a temporary situation in which all three ports 40A, 40B, and 40C are interconnected. Insofar as the second and third main ducts are also interconnected continuously, all four main ducts 21A, 21B, 31A and 31B are interconnected in this temporary situation. However, it can be seen that constrictions R1 and R2 are disposed respectively on the interconnection between the first port 40A and the third port 40C, and on the interconnection between the second port 40B and the third port 40C.

The valve 40 is, in particular, of the type comprising a moving slide mounted to slide in a bore, and suitable for taking up two opposite positions corresponding respectively to the first and to the second stable positions S1 and S2, while the intermediate position I is taken up by the slide while it is moving between its two opposite positions.

In the example shown in FIG. 1, the control means for causing the slide to move are hydraulic control means, with a solenoid valve 50 which is suitable for connecting a command duct 52 either to the booster pump 14 or to an unpressurized reservoir R, which command duct feeds one or more control chambers 44 of the valve 40. The control means further comprise a return spring 45.

In accordance with the invention, the temporary situation I corresponding to the intermediate position of the slide of the valve 40 is maintained for a period of time, in an intermediate stage in the movement of the slide between its two end positions, at least in one movement direction.

With reference to the second embodiment, examples are described below for the hydraulic control means that make it possible to achieve this intermediate stage.

The second embodiment of the invention is described below, with reference to FIG. 2. The circuit shown in FIG. 2 also serves to drive in translation a vehicle that has two axles, each of which has two driven wheels. There can also be seen the pump unit 10, with the main pump 12 and its two orifices 12A, 12B, as well as the booster pump 14 and the pressure limiters 16. There can also be seen the two motors of the first set 20 and 22, and the first main duct 21A that is connected to the orifice 12A and that feeds the motors 20 and 22 in parallel, as well as the second main duct 21B that is connected to the second orifice 12B of the pump and that makes it possible for the motors 20 and 22 to be discharged in parallel.

There can also be seen the motors 30 and 32 of the second set, as well as the third main duct 31A and the fourth main duct 31B that serve to discharge and to feed in parallel the motors 30 and 32.

For selecting the overall cubic capacity of the circuit, said circuit further includes a selector 60 which, in this second embodiment, is a valve having four ports, namely a first port 60A connected continuously to the first main duct 21A, a second port 60B connected continuously to the second main duct 21B, a third port 60C connected continuously to the third main duct 31A and a fourth port 60D connected continuously to the fourth main duct 31B.

In this example, the selector is equipped with a low-pressure selector valve or shuttle 70 whose function is explained below.

The selector 60 is suitable for taking up a first stable position S'1 in which the ports 60A & 60C and the ports 60B & 60D communicate in pairs. Thus, when the selector is in the first stable position, the motor sets 20 & 22 and 30 & 32 are connected in parallel to the pump 12.

Figure 2:
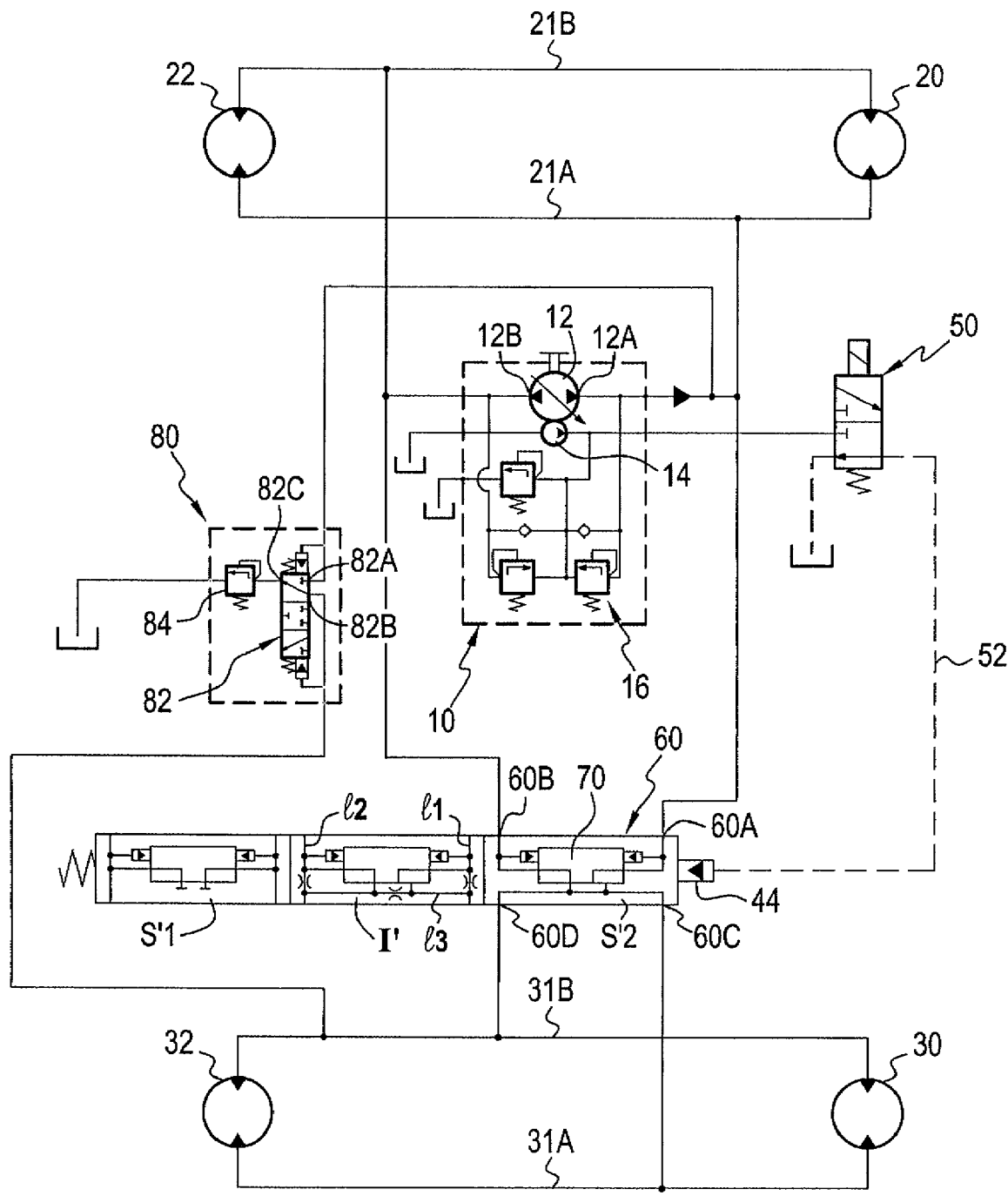
FIG. 2 is a diagram showing a hydraulic circuit including an overall cubic capacity selector device of the invention in a second embodiment in which the device comprises a selector that is a four-port valve.

The selector 60 can also take up a second stable position S'2 in which it is shown in FIG. 2. In this position, the ports 60B, 60C, and 60D communicate with one another, while the port 60A is isolated from the other ports. Thus, the first motor set 20, 22 operates normally since the first and second main ducts 21A and 21B are connected to respective ones of the two orifices of the pump while being isolated from each other, whereas the second motor set 30, 32 is inactive since the third and fourth main ducts 31A and 31B are interconnected and are, in this example, also connected to the second main duct 21B.

In its second stable position S'2, the selector 60 makes it possible to connect that one of the first and second main ducts 21A and 21B that is at the lower pressure to the third and fourth main ducts 31A and 31B. This is achieved by means of the low-pressure selector valve 70.

The selector can also take up an intermediate position I', in which all four of its ports 60A, 60B, 60C, and 60D are interconnected via constrictions. As indicated above, this intermediate position makes it possible to connect at least one of the first and second main ducts 21A and 21B to the main ducts 31A and 31B that are also interconnected. In the intermediate position, the first and third ports 60A, 60C are interconnected via a first passage 11 having a first restriction, the second and fourth ports 60B, 60D are interconnected via a second passage 12 having a second restriction, and the third and fourth ports 60C, 60D are interconnected via an additional passage 13 having an additional constriction. In a variant, the additional passage can be between the first and second ports 60A, 60B.

The circuit shown in FIG. 2 also includes an exchange device 80 which makes it possible to take fluid from one of the main ducts and to bring it back to the reservoir in order to prevent fluid from overheating in the circuit, the fluid taken being compensated by the booster pump.

The exchange device 80 comprises an exchange selector 82 which, in conventional manner, has two inlet ports 82A and 82B. Conventionally, such a selector has its two inlet ports connected to respective ones of the two main ducts of the same loop of a circuit serving respectively as feed duct and discharge duct for a motor set. Thus, it is conventional to connect the ports 82A and 82B to respective ones of the main ducts 21A and 21B. The selector puts that one of its inlet ports that is at the lower pressure into communication with its outlet port 82C, so as to take fluid from that one of the main ducts that is at the lower pressure.

However, in the circuit shown in FIG. 2, the two inlet ports 82A and 82B of the selector 82 are connected respectively to the first main duct 21A and to the fourth main duct 31B.

When the selector 60 is in its first stable position S'1, the two motor sets are fed in parallel, so that one of the first and fourth main ducts serves as the feed duct while the other one of them serves as the discharge duct. The selector 82 thus takes the fluid from the main ducts at low pressure.

Conversely, when the selector 60 is in its second stable position S'2, either the first main duct 21A serves as the feed duct, in which case the port 60A of the selector is isolated from the other three ports that are interconnected, so that the fourth main duct is, in particular, connected to the second main duct 21B and is thus at the discharge pressure, in which case the selector 82 selects the interconnection between its second inlet port 82B and its outlet port 82C, and it is indeed from the discharge pressure that the exchange takes place, or else the first main duct serves as the discharge duct, so that the port 60A is connected to the ports 60C and 60D via the shuttle 70. In which case, both of the first and second main ducts are substantially at the discharge pressure, and the two inlet ports 82A and 82B are thus connected to a pressure in the vicinity of the discharge pressure. In which case, either the selector 82 takes up its neutral position in which all of the ports are isolated from one another, or else it takes up one of the two end positions connecting either the port 82A or the port 82B to the outlet port 82C, depending on any slight differences in pressure at the ports 82A and 82B.

In any event, the exchange takes place normally when the first main duct 21A serves as the feed duct as indicated above. If the vehicle has a preferred operating direction, provision is made for said preferred direction to correspond to a configuration in which the first main duct 21A serves as the feed duct.

The exchange that is then implemented takes fluid from the fourth main duct and thus from the bypassed main ducts of the second motor set. This makes it possible to prevent the fluid of the bypassed axle from overheating.

In conventional manner, the exchange device 80 further comprises a pressure limiter 84 situated at the outlet of the selector 82, so as to perform actual exchange only when the fluid pressure is sufficient.

A description follows of FIGS. 3 to 6 which show, in four different situations, an embodiment for the selector 60 of FIG. 2. The selector comprises a body 62 with an internal bore 63 in which a slide 64 is disposed. The ports 60A, 60B, 60C, and 60D are formed by holes in the body 62 that open out into the bore 63. In this example, considered in the movement direction S in which the slide 64 moves from its first end position shown in FIG. 3 to its second end position shown in FIGS. 5 and 6, the holes 60A, 60C, 60D, and 60B open successively into the bore substantially equidistantly. The slide 64 is provided with two grooves 66A and 66B disposed on its axial outside periphery.

As indicated above, the selector 60 is provided with a low-pressure selector shuttle 70. Said shuttle comprises a shuttle slide 72 disposed in an axial bore 73 in the slide 64. A stopper 74 screw-fastened or fastened by any other suitable means to one end of the bore 73 defines the stroke of the slide 72, at the end opposite from the end wall 73, of the bore 73. A first control chamber 75A is defined at a first end of the slide 72, in the vicinity of the end wall 73' of the bore 73. This first control chamber communicates with a hole 76A in the slide 64 so that said first control chamber can be put into communication with the first port 60A of the selector 60 as can be seen in particular in FIGS. 5 and 6. A second control chamber 75B is defined by the other end of the slide 72, in the vicinity of the stopper 74. Via a hole 76B in the slide 64 that communicates with the groove 66B, said second control chamber 75B can be put into communication with the second port 60B and with the fourth port 60D of the selector 60, as can be seen in particular in FIG. 3.

The shuttle slide 72 is also provided with internal holes, namely a hole 77A communicating with the chamber 75A and a hole 77B communicating with the chamber 75B.

Figure 6:
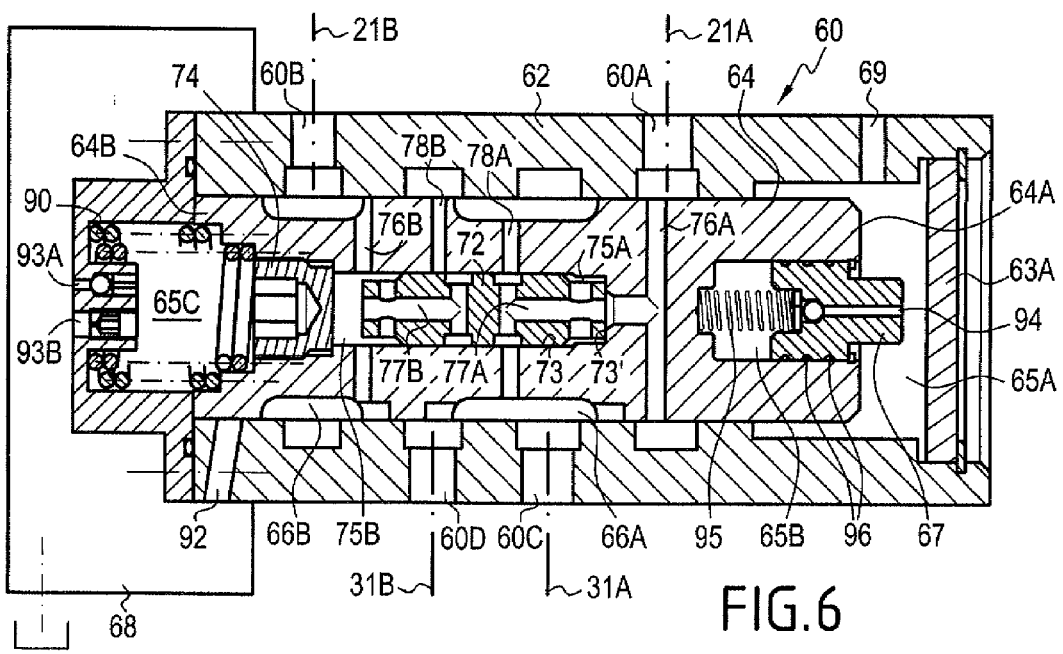

Furthermore, in addition to the above-described holes, the slide 64 is provided with a radial hole 78A that connects the bore 73 to the groove 66A in the slide 64 so that said radial hole can communicate with the ports 60C and 60D of the selector 60 as can be seen in FIG. 6, and a radial hole 78B that opens out into the bore 73 between the holes 78A and 76B and on the axial periphery of the slide 64 between the grooves 66A and 66B.

As indicated above, the selector device of the invention advantageously has selector control means that make it possible to perform a fast movement first step for moving the slide quickly between an initial stable position and a position corresponding to the beginning of the intermediate stage, and a braked movement step during which the intermediate stage takes place.

The control means shown in FIGS. 3 to 6 make these fast and braked steps possible. More precisely, the control means for causing the slide 64 to move comprise a first control chamber 65A formed in the bore 63, at one end 64A of the slide 64, and a second control chamber 65B formed in a cavity in said end 64A of the slide and separated from the first chamber 65A by a control piston 67 disposed in said cavity. The first control chamber is suitable for being connected to first command means so as to enable the assembly made up of the slide 64 and of the control piston 67 to move in the direction F in a fast movement first step at the end of which the control piston 67 finds itself in an end position. The second control chamber 65B is suitable for being connected to second command means so as to enable the slide to move relative to the control piston 67 in the direction F, in a slow movement second step. The direction F is the direction in which the command means enable the fluid to flow out from the chambers 65A and 65B.

In this example, the control means further comprise a third control chamber 65C for acting with said first and second control chambers to cause the slide to move in the two opposite directions.

Operation of these control means is described below with reference to FIGS. 3 to 6.

Figure 3:
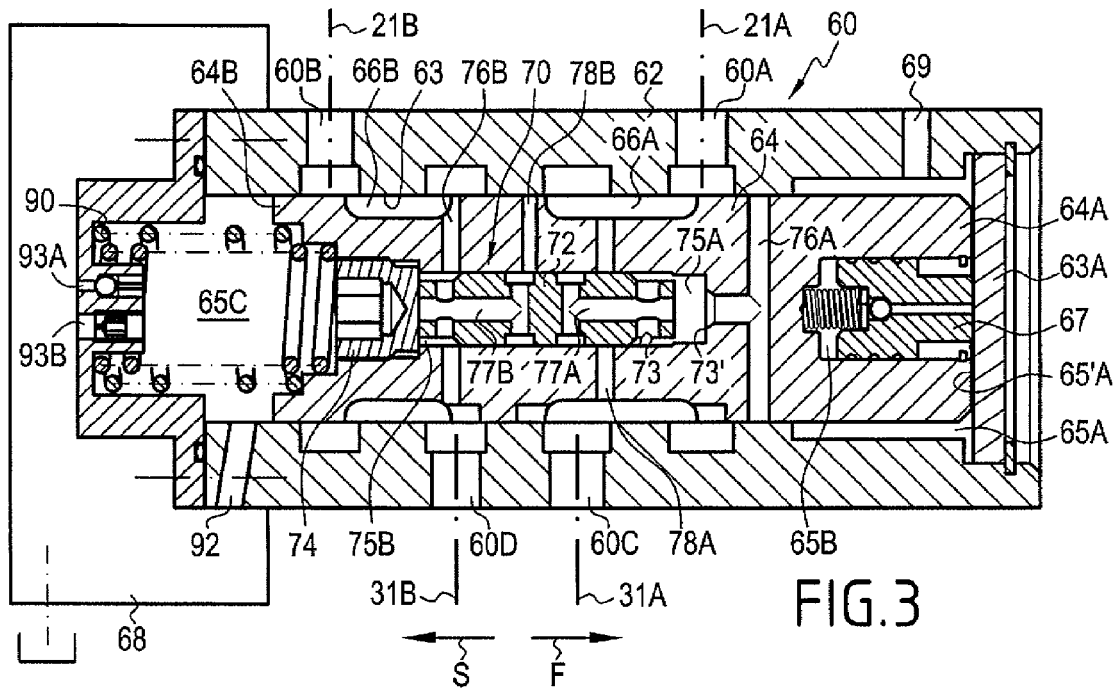
FIGS. 3 to 6 are diagrammatic axial section views showing the selector of the device of FIG. 2, in four distinct situations.

In FIG. 3, the selector is shown in its first stable position, in which the first and third ports 60A and 60C, and the second and fourth ports 60B and 60D communicate with each other in respective pairs. In this position, the end 64A of the slide 64 is in abutment against the end wall 65'A of the chamber 65A, which end wall is, for example, defined by a closure piece 63A disposed at the end of the bore 63. In this situation, the control piston 67 is retracted into its second control chamber 65B. Conversely, the volume of the third control chamber 65C is at its maximum. The slide 64 is urged to return into this first stable position by the return force exerted by one or more return springs 90 which, in this example, co-operate with that end 64B of the slide that is opposite from its end 64A, and are disposed in the chamber 65C. The chamber 65C is in communication with an unpressurized fluid enclosure 68, via ducts 92, 93A, and 93B.

The duct 92 makes it possible for fluid to flow substantially freely between the enclosure 68 and the chamber 65C. The duct 93B makes it possible for fluid to flow in both directions between the enclosure 68 and the chamber 65C, but it is provided with a restriction limiting this flow. The duct 93A is provided with a check valve enabling fluid to flow substantially freely in one flow direction only, namely from the enclosure 68 to the chamber 65C.

Figure 4:
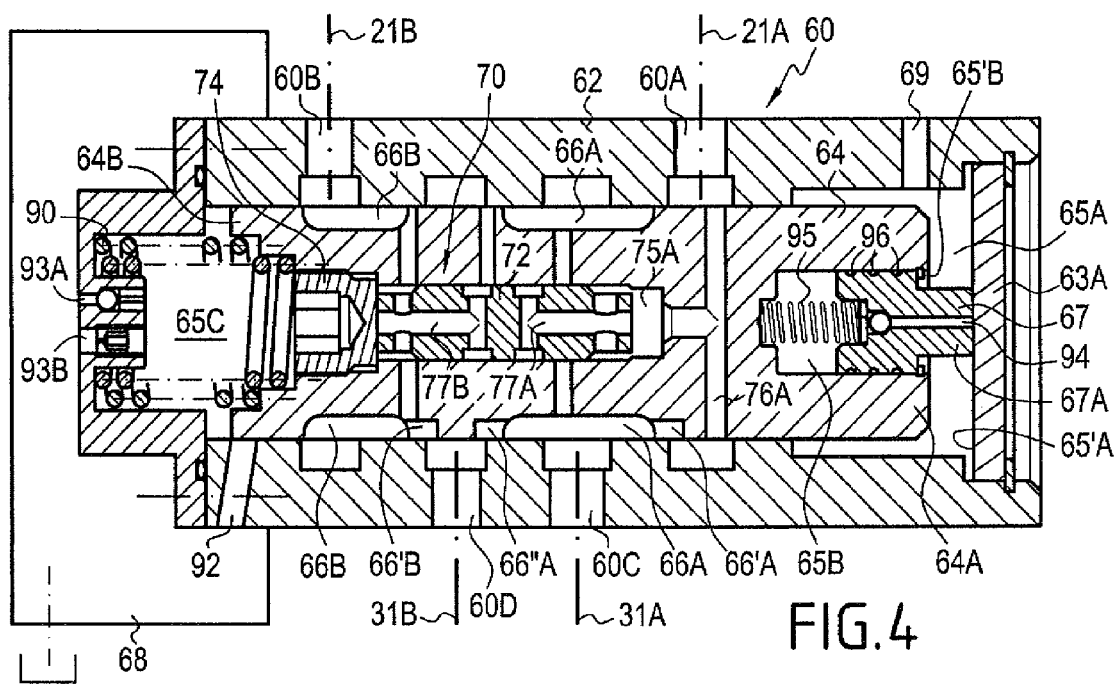

FIG. 4 shows the selector 60 in the intermediate position, in which the ports 60A, 60B, 60C, and 60D communicate with one another but in constricted manner. It can be seen that the first port 60A communicates with the third port 60C via a notch 66'A formed in one edge of the groove 66A, that the port 60C communicates with the port 60D via a notch 66"A formed in the other edge of the groove 66A, and that the port 60D communicates with the port 60B via a notch 66'B formed in one edge of the groove 66B. In order to make it possible to go from the first stable position of FIG. 3 to the intermediate position of FIG. 4, the slide 64A undergoes a fast movement first step in the direction S, during which the control chamber is fed with command fluid via the command duct 69, while the fluid can flow out of the chamber 65C freely via the duct 92. This duct 92 opens into the bore 63 such that its opening is unobstructed when the slide 64 is in its first stable position but such that it is masked by the periphery of said slide when said slide is in the intermediate position. Thus, as from this situation, the fluid can flow out of the chamber 65C only by flowing through the duct 93B provided with a constriction. This limited fluid flow rate brakes the movement of the slide in the direction S.

It can be noted that, in FIG. 4, the free end 67A of the control piston 67 is in abutment against the end wall 65'A of the control chamber 65. The chamber 65B has been fed during the feeding of the chamber 65A via a command duct 94 provided with a check valve, so as to enable fluid to flow substantially freely between the chambers 65A and 65B only in the direction going from the chamber 65A to the chamber 65B. This causes the piston 67 to move in the direction in which it is deployed from the chamber 65B, until it comes into abutment against a circlip or the like 65'B. This movement also takes place under the return drive from a spring 95 disposed in the chamber 65B.

Figure 5:
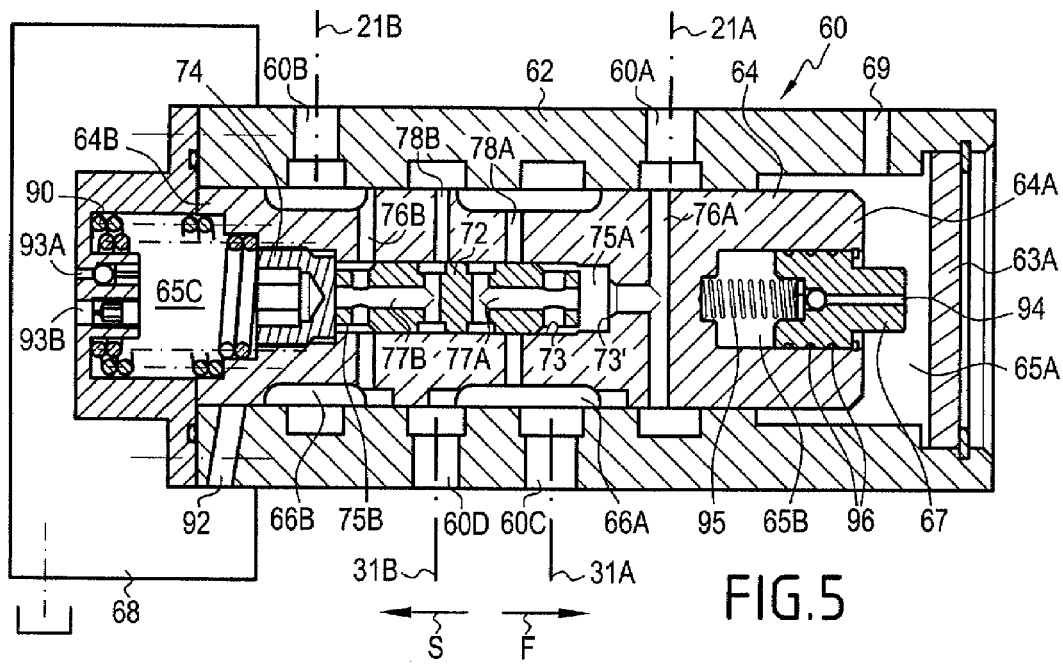

In FIG. 5, the selector 60 is in its second stable position, and it can be seen that the third and fourth ports 60C and 60D communicate with each other via the groove 66A. In the situation shown, it is the first main duct that serves as the feed duct, so that the port 60A of the selector is at a pressure higher than the pressure of the port 60B. Therefore, the shuttle slide 72 has remained in its position in which it is in abutment against the stopper 74, in which position its outside periphery closes off the hole 78A in a manner such as to isolate the first port 60A from the groove 66A, and thus from the third and fourth ports 60C, 60D, although the first port 60A communicates with the chamber 75A via the duct 76A.

When the shuttle slide 72 is in this position, the hole 77B therein communicates with the hole 78B of the slide 64 and thus with the fourth port 60D. Insofar as the hole 77B is also put into communication with the second port 60B of the selector via the groove 66B, the hole 76B and the chamber 75B, the second port 60B then communicates with the third and fourth ports 60C and 60D which are interconnected via the groove 66A.

In order to reach the position shown in FIG. 5 starting from the position shown in FIG. 4, the slide 64 of the selector has undergone a slow movement step. Fluid has continued to be fed from the chamber 65A via the command duct 69 but fluid can flow out of the chamber 65C only via the constriction of the passage 93B.

In FIG. 6, the slide 64 is in the same position as in FIG. 5, but the shuttle slide 72 is in a different position. In FIG. 6, it is the second main duct 21B that is at the high pressure, so that the second port 60B of the selector 60 is at a pressure higher than the pressure of the first port 60A. In which case, the third and fourth ports 60C and 60D communicate with each other as in FIG. 5, but it is with the first port 60A and no longer with the second port 60B that they communicate. The high pressure at the second port 60B has fed the chamber 75B via the groove 66B and via the hole 77B in a manner such as to push the shuttle slide 72 away towards the end 73' of the bore 73 that is opposite from the stopper 74. In this situation, the hole 78B that is in communication with the fourth port 60D of the selector is closed off by the outside periphery of the shuttle slide 72. Since the groove 66B is also isolated from the fourth port 60D by the outside periphery of the slide 64, the second port 60B is isolated from the other three ports of the selector. Conversely, the first port 60A communicates with the third port 60C via the hole 76A of the slide 64, via the chamber 75A, via the hole 77A in the shuttle slide 72, via the hole 78A in the slide 64, and via the groove 66A.

In order to cause the slide 64 to move from its second stable position shown in FIG. 5 or in FIG. 6 to its first stable position shown in FIG. 3, the fluid is allowed to flow out from the first control chamber 65A, e.g. by connecting the command duct 69 to an unpressurized reservoir. Conversely, the slide 64 is urged to move in the direction F by the force exerted by the springs 90. The slide then undergoes a fast movement first step. The fluid flowing out from the chamber 65 flows out freely via the command duct 69. The slide 65 thus rapidly reaches its intermediate position shown in FIG. 4. As from this situation, the slide can continue to move in the direction F only if the volume of the control chamber 65B decreases sufficiently. However, the check valve disposed in the duct 94 does not allow the fluid to flow out. Such discharge is made possible only via a constricted discharge duct formed, for example by a helical groove 96 provided in the outside periphery of the control piston 67. Since this discharge duct is constricted, the volume of the chamber 65B decreases slowly, so that the slide 64 moving towards its first stable position as shown in FIG. 3 is braked.

The above-described control means are an advantageous embodiment. Naturally, other hydraulic control means can be used, e.g. the means of the type described in Patent Document EP 1 058 002 which, although it concerns a context that is different from the context of the present invention, describes control means that can be used for implementing it.

Similarly, by means of the constricted communication during the intermediate stage that is achieved via the notches 66'A, 66"A, 66'B in the edges of the grooves 66A and 66B, the cross-section of each of the constricted interconnections varies during the intermediate stage. More generally, provision can be made for the cross-section(s) of the constricted interconnections to vary during the intermediate stage.

Conversely, it can be preferred for the cross-section(s) of the constricted interconnections to remain substantially constant during the intermediate stage, e.g. by making provision for the constricted interconnections to be achieved via holes having particular configurations and being disposed in particular manners, as described in EP 1 058 002.

Similarly, the passages making such constricted interconnections possible can have a plurality of portions, e.g. a first portion enabling fluid to flow substantially freely, and a second portion that is constricted.

As indicated above, it is, however, possible to use any type of suitable means, in particular electronic means.

Thus, advantageously, the device is provided with control means for causing the selector to move between these stable positions, during which movement the temporary situation exists, which control means are suitable for servo-controlling a variable representative of operation of the vehicle to a set point by means of controlled movement of the selector.

For example, the representative variable is determined on the basis of at least one of the parameters comprising the pressure in at least one of the main ducts, the flow rate in at least one of the main ducts, the output torque of at least one of the motors, the output speed of at least one of the motors, the speed of the vehicle, position relative to a target, distance relative to a target, the acceleration or the deceleration of the vehicle, the acceleration or the deceleration of at least one of the motors, an operating parameter of the pump, the power consumed or delivered by the pump or by its drive motor, an operating parameter of an auxiliary motor driving said pump and an operating parameter of a tool fed hydraulically from the circuit, in particular from the booster pump.

More generally, said servo-controlled variable can be an operating parameter of the transmission or of any member of the vehicle, said variable being deemed to be representative as a function of the conditions under which the vehicle is used.

For the servo-control, a set point is given for the variable, and the slide of the selector is caused to move such that the servo-controlled variable, whose value is measured regularly, approaches the target value or undergoes the desired variation.

The servo-controlled representative variable can be determined directly or on the basis of a critical parameter that is measured. In which case, the control means for causing the selector to move further comprise electronic control means and the overall cubic capacity selector device further comprises means for measuring the value of at least one critical parameter, for computing the value of the representative variable on the basis of said measured value, and for causing the selector to move from one to the other of said stable positions as a function of the value of the computed representative variable.

In general, any control means of known type, and in particular the control means described in EP 1 058 002 can be used.

When servo-control is used, the device advantageously further comprises an electronic control unit (ECU) suitable for receiving the detected value for the representative parameter, for determining the current value of the servo-controlled variable, either directly on the basis of said parameter, or by computation, for comparing said value with the value of the set point that has been read, computed, or stored, and for transmitting accordingly a control signal to the slide of the selector.

Advantageously, the servo-control has a regulation system of the proportional-integral-derivative (PID) type for transmitting the control signal.

Preferably, the set point is a variation relationship for the servo-controlled variable. This set point can be determined by an actuator controlled by an operator (pedal, lever, etc.).

The device can further comprise storage means for storing at least two variation paths for the servo-controlled variable.

In addition, the device can further comprise means serving, during servo-control of the of the position of the slide of the selector, to vary the cubic capacity of the pump for feeding fluid to the circuit and/or to act on a member of the vehicle (such as the drive motor of the pump, a main engine or a main electric motor, brake members, etc.). This modification of the operation also serves to limit the jolt due to increasing or reducing the overall cubic capacity of the circuit.

Advantageously, the device further comprises means for detecting the value of a parameter for implementing the servo-control and for controlling the servo-control once the detected value has reached a target value. For example, it is possible to choose to seek to limit the jolt on going from a small cubic capacity to a large cubic capacity by dynamically braking the motor set that remains active in the small cubic capacity mode or the drive motor of the pump, and to choose to start the servo-control only once it has been observed that the braking is not sufficient to limit the jolt correctly, e.g. because the braking set point has reached a threshold value. The value of said set point can be given by the position of a control joystick for causing the vehicle to move in translation.

Advantageously, the device further comprises means for detecting the value of a change parameter on which changing the overall cubic capacity of the circuit is based and for automatically causing the selector to move in the direction in which a cubic capacity change takes place when the detected value reaches a target value. This automatic control can but does not necessarily go as far as actually to change the cubic capacity. For example, the selector can be placed in its intermediate position for some time in order to effect hydrostatic braking or hydrostatic acceleration, preferably by means of the above-described servo-control.

The invention claimed is:

1. A device for selecting the overall cubic capacity of a hydraulic circuit comprising:
    a first motor set comprising at least one first hydraulic motor for driving first vehicle-moving means for moving a vehicle, and
    a second motor set comprising at least one second hydraulic motor for driving second vehicle-moving means for moving the vehicle, said first and second vehicle-moving means being situated one behind the other in a direction in which the vehicle moves,
    the circuit further comprising first and second main ducts for the first motor set, and third and fourth main ducts for the second motor set, the first and third main ducts and the second and fourth main ducts being suitable for being connected in respective pairs to respective ones of two orifices of a pump for feeding and discharging the motor sets in parallel,
    the device comprising a selector suitable for taking up a first stable position corresponding to a first configuration of the selector device, in which configuration the third and fourth main ducts are connected to respective ones of the orifices of the pump, and said third and fourth ducts are isolated from each other so that the second motor set is active, and for taking up a second stable position corresponding to a second configuration of the selector device, in which configuration one of the first and second main ducts is connected to the third and fourth main ducts, so that the second motor set is inactive, the selector being such that, while the selector is moving between said stable positions, a temporary situation exists in which the first, second, third, and fourth ducts are interconnected;

said device further comprising means serving, at least while the selector is moving in a first direction between its first and second stable positions, to sustain said temporary situation for a period of time in an intermediate stage during which an interconnection between the third and fourth main ducts and an interconnection between at least one of the first and second main ducts and at least one of the third and fourth main ducts are constricted.

2. A device according to claim 1, wherein, during the intermediate stage, the interconnection between the third and fourth main ducts and the interconnection between at least one of the first and second main ducts and at least one of the third and fourth main ducts have constricted cross-sections that are different.

3. A device according claim 1 wherein the cross-section of at least one of the constricted interconnection between the third and fourth main ducts and the constricted interconnection between at least one of the first and second main ducts and at least one of the third and fourth main ducts remains substantially constant during the intermediate stage.

4. A device according to claim 1 wherein the cross-section of at least one of the constricted interconnection between the third and fourth main ducts and the constricted interconnection between at least one of the first and second ducts and at least one of the third and main ducts varies during the intermediate stage.

5. A device according to claim 1, wherein the selector is a valve having at least three ports, comprising first, second, and third ports connected respectively to the first, to the second, and to the third main ducts, and the device further comprises means for interconnecting the second and the fourth main duct, the first and second main ducts being respectively connected to the first and to the second orifices of the pump.

6. A device according to claim 5, wherein the fourth main duct and the second main duct are interconnected via an interconnection duct that is external to the selector, and, when the selector is in the first stable position, the first and third ports are interconnected while being isolated from the second port, and, when the selector is in the second stable position, the second and third ports are interconnected while being isolated from the first port, whereas, in the temporary situation, the first and second ports are interconnected and the second and third ports are interconnected.

7. A device according to claim 5, wherein the valve has a fourth port connected to the fourth main duct and, when the selector is in the first stable position, the first and second ports and the second and fourth ports are interconnected in respective pairs, and, when the selector is in the second stable position, the third and fourth ports are interconnected and are connected to one of the first and second ports while being isolated from the other of the first and second ports, whereas, in the temporary situation, the first and second ports are connected via a first passage having a first constriction, the second and fourth ports are interconnected via a second passage having a second constriction, and an additional passage having an additional constriction exits between the first and second ports or between the third and fourth ports.

8. A device according to, claim 1 wherein, when in its second stable position, the selector enables connection of one of the first and second main ducts that is at the lower pressure to the third and fourth main ducts.

9. A device according to claim 8, wherein the selector is a valve that has first, second, third, and fourth ports, connected to respective ones of the first, second, third, and fourth main ducts, and said valve has a shuttle suitable, when said selector is in the second stable position, for putting the third and fourth ports into communication with that one of the first and second ports that is at the lower pressure.

10. A device according claim 1, further comprising means for causing the selector to move between said stable positions, during which movement said temporary situation exists, which control means are suitable for causing a fast movement first step to take place between the initial stable position of the selector and a position corresponding to the beginning of the intermediate stage, and for causing a braked movement step to take place during which the intermediate stage takes place.

11. A device according to claim 10, wherein the control means are also suitable for causing another fast movement step to take place towards the other stable position, at the end of the intermediate stage.

12. A device according to claim 1, wherein the selector is a valve comprising a slide mounted to move in a bore the slide being suitable for taking up two opposite positions corresponding to respective ones of the first and second stable positions of the selector, and, while the slide is moving between these two opposite positions, being suitable for taking up an intermediate position corresponding to said temporary situation.

13. A device according to claim 12, wherein the control means for causing the slide to move comprise a first control chamber formed in the bore, at one end of the slide, and a second control chamber formed in a cavity in said end of the slide and separated from the first chamber by a control piston disposed in said cavity, the first control chamber being suitable for being connected to first command means so as to enable the assembly made up of the slide and of the control piston to move in a first direction in a fast movement first step at the end of which the control piston finds itself in an end position, and the second control chamber being suitable for being connected to second command means so as to enable the slide to move relative to the control piston in the first direction, in a slow movement second step.

14. A device according to claim 13, wherein the control means for causing the slide to move further comprise a third control chamber for acting with said first and second control chambers to cause the slide to move in two opposite directions.

15. A device according to claim 1, further comprising means for causing the selector to move between said stable positions, during which movement said temporary situation exists, which means are suitable for servo-controlling a variable that is representative of operation of the vehicle to a set point by causing the selector to move in controlled manner.

16. A device according to claim 15, wherein the representative variable is determined on the basis of at least one of the parameters constituted by the pressure in at least one of the main ducts, the flow rate in at least one of the main ducts, the number of revolutions at the outlet of at least one of the motors, the output speed of at least one of the motors, the speed of the vehicle, position relative to a target, distance relative to a target, the acceleration or the deceleration of the vehicle, the acceleration or the deceleration of at least one of the motors, an operating parameter of the pump, the power being consumed, an operating parameter of an auxiliary motor driving said pump, and an operating parameter of a tool fed hydraulically from the circuit.

17. A device according to claim 1, wherein the control means for causing the selector to move further comprise electronic control means, and said device further comprises means for measuring the value of at least one critical parameter, for computing the value of the representative variable, and for causing the selector to move from one to the other of its stable positions as a function of the value of the computed representative variable.

18. A hydraulic circuit comprising a first motor set comprising at least one first hydraulic motor for driving first vehicle-moving means for moving a vehicle, and a second motor set comprising at least one second hydraulic motor for driving second vehicle-moving means for moving the vehicle, said first and second vehicle-moving means being situated one behind the other in a direction in which the vehicle moves, the circuit further comprising first and second main ducts for the first motor set, and third and fourth main ducts for the second motor set, the first and third main ducts and the second and fourth main ducts being suitable for being connected in respective pairs to respective orifices of a pump for feeding and discharging the motor sets in parallel;

said hydraulic circuit further comprising a selector device according to claim 1 for selecting the overall cubic capacity of the circuit.

19. A hydraulic circuit according to claim 18, further comprising an exchange device having an exchange selector which has two inlet ports connected to respective ones of the first and fourth main ducts, and an outlet port to which that one of said inlet ports that is at the lower pressure is suitable for being connected.

* * * * *